United States Patent
Laulhe et al.

(10) Patent No.: US 6,467,364 B1
(45) Date of Patent: Oct. 22, 2002

(54) COUPLING APPARATUS FOR ROTATING A ROTATABLE PART WITH A MOVABLE SLIDE

(75) Inventors: René Laulhe, Villenave d'Ornon; Claude Wattignier, Talence, both of (FR)

(73) Assignee: KSB S.A., Gennevbilliers (FR)

( * ) Notice: Subject to any disclaimer, the term of this patent is extended or adjusted under 35 U.S.C. 154(b) by 0 days.

(21) Appl. No.: 09/209,137

(22) Filed: Dec. 10, 1998

(30) Foreign Application Priority Data

Dec. 10, 1997 (FR) ............................................. 97 15610

(51) Int. Cl.[7] ................................................ F15B 13/16
(52) U.S. Cl. ............................................ 74/103; 251/62
(58) Field of Search ........................... 251/62, 249.5, 251/58; 74/424 VA, 102, 103, 104; 192/85 AB; 92/130 C, 138, 62

(56) References Cited

U.S. PATENT DOCUMENTS

| | | | | |
|---|---|---|---|---|
| 1,119,758 A | * | 12/1914 | Kings ........................ 92/138 X |
| 1,229,443 A | * | 6/1917 | Hall et al. ................. 92/138 X |
| 1,517,728 A | * | 12/1924 | Heath ................... 92/130 C X |
| 2,190,228 A | * | 2/1940 | Bowen ......................... 92/131 |
| 3,261,266 A | * | 7/1966 | Ledeen et al. ................. 92/138 |
| 3,452,961 A | | 7/1969 | Forsham |
| 3,460,799 A | * | 8/1969 | Sanctuary ................. 74/104 X |
| 3,672,260 A | * | 6/1972 | Gachot et al. ............ 74/102 X |
| 3,709,106 A | * | 1/1973 | Shafer ...................... 251/58 X |
| 4,338,857 A | * | 7/1982 | Mason .......................... 92/62 |
| 4,442,931 A | * | 4/1984 | Montalvo, Sr. ......... 192/85 AB |
| 4,533,113 A | * | 8/1985 | Francart, Jr. .............. 251/62 X |
| 5,000,077 A | | 3/1991 | Habicht |

FOREIGN PATENT DOCUMENTS

| | | | |
|---|---|---|---|
| FR | 1460561 | 10/1966 | |
| JP | 54-50740 | * 4/1979 | .................. 92/138 |
| JP | 56-113876 | * 9/1981 | .................. 92/138 |

* cited by examiner

Primary Examiner—David A. Bucci
Assistant Examiner—Colby Hansen
(74) Attorney, Agent, or Firm—Knobbe, Martens, Olson & Bear LLP

(57) ABSTRACT

Mechanism for obtaining a couple for maneuvering a part to make it rotate on itself through a quarter turn, from a member moving along a trajectory, via a transmission such that the curve representing the reduction coefficient, which is the ratio of the maneuvering couple to a nominal couple, shown on the y axis, as a function of the angle of rotation, shown on the x axis, is convex, the curve rotating its convexity upwards and the peak coefficient of reduction being obtained for an angle of about 20 to 40°.

7 Claims, 3 Drawing Sheets

COUPLING APPARATUS FOR ROTATING A ROTATABLE PART WITH A MOVABLE SLIDE

FIELD OF THE INVENTION

The present invention relates to mechanisms for obtaining a couple for maneuvering a component or part for rotating it on itself through a quarter turn, starting from a member which moves along a trajectory via a transmission.

BACKGROUND OF THE INVENTION

As mechanisms of this type, notably for a large-diameter butterfly stopvalve actuator, the scotch-yoke, the crank-connecting rod support system, the rack and pinion and the wheel-tangent screw are already known. All these systems have the disadvantages of supplying an exaggeratedly large couple in certain operating phases and thus requiring over-sizing of the control of the actuator to supply the couple required for maneuvering into every position.

French patent no. 1 460 561 expressly mentions that it relates to a mechanism driving a rotation shaft through a quarter turn with the transmitted couple increasing continuously from one end position to the other end position.

U.S. Pat. No. 5,000,072 proposes that a shaft 78 or 178 in FIG. 8 be driven by a lever arm 74 mounted on rollers 82. The patent is absolutely silent on the variation of the couple. It is clear, e.g. from FIG. 8, that there is a transition from one end position to the other by rotating through 90° with a symmetry, with the result that the curve which has a maximum between 20 and 40° according to the invention is not achieved.

Finally, U.S. Pat. 3,452,961 describes a device for controlling an actuator with variation of the couple, but it too proposes continuous variation of the couple, pointing out that in one end position a major couple and slow speed are required and in the other end position a small couple and high speed are required. The couple varies continuously without going through a maximum.

SUMMARY OF THE INVENTION

The invention overcomes the disadvantage of the prior art by means of a mechanism in which the transmission is such that the curve representing the coefficient of reduction, which is the ratio of the maneuvering couple to a nominal couple, shown on the y axis as a function of the angle of rotation, shown on the x axis, is convex with the upwardly facing convexity.

Thanks to this, the couple supplied can be adapted as a function of the couple required, thereby saving energy so that no oversizing is required. Preferably, the maximum coefficient of reduction is obtained with an angle of 20 to 40 degrees, more preferably between 28 to 37 degrees.

Among the various transmissions which give a curve is according to the invention, the particularly preferred one is the one in which the member moving along a trajectory is a slide on which is mounted, guided in a direction not parallel to the trajectory, a shoe being securely attached to the component which is fixedly mounted but rotatable. The term "shoe" in this specification also denotes a wheel or roller rolling along a rail and, generally speaking, any member moving along in the direction not parallel to the trajectory. This solution makes it possible to use any source of energy, be it manual, electrical, pneumatic, hydraulic or recoil energy stored in energy accumulating cartridges. The mechanism is irreversible for the manual and electrical solutions. The irreversibility of the other controls is ensured by the maintenance of pressure in the jacks. The arrangement is very simple and uses very few components.

BRIEF DESCRIPTION OF THE DRAWINGS

In the accompanying drawings, which are provided solely by way of example:

FIG. 2 shows it in the closed position and FIG. 3 in the open position.

DETAILED DESCRIPTION OF THE INVENTION

Figure 1:
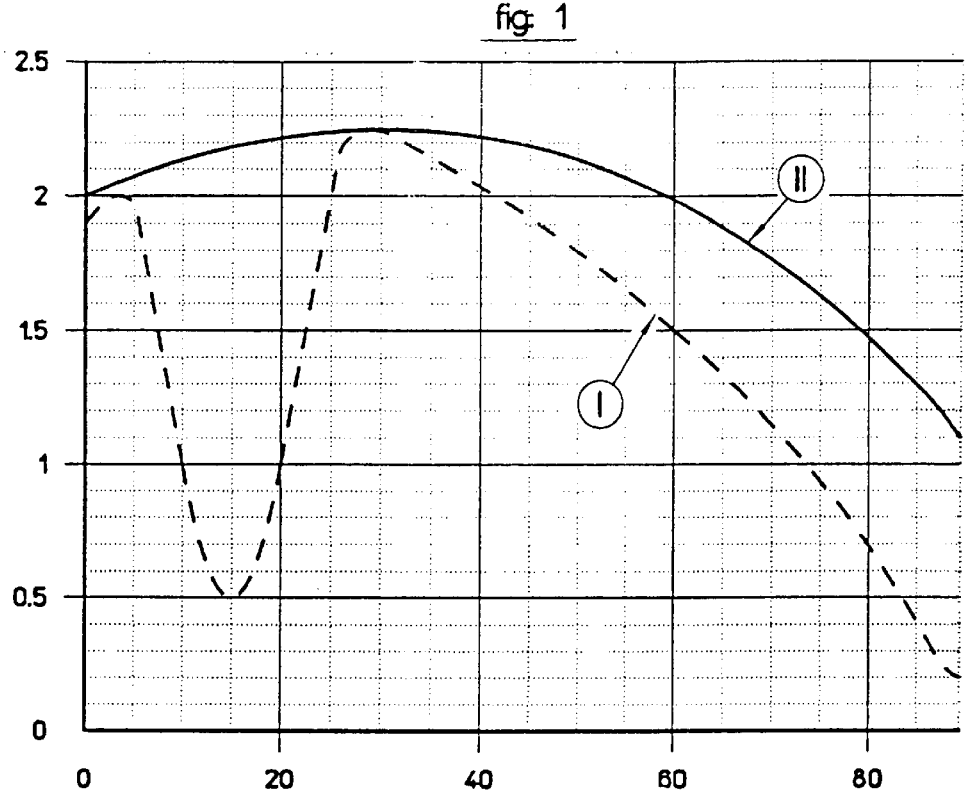
FIG. 1 is a graph illustrating the invention.

The graph in FIG. 1 shows the angles of opening in degrees on the x axis and the coefficient of reduction on the y axis. The coefficient of reduction is the ratio of the maneuvering couple to a nominal couple. It is a relative value of the couple supplied. Curve I, shown by dotted lines in FIG. 1, shows the couple needed on the stopvalve, whereas curve II represents the couple provided by the actuator and hence supplied by the mechanism according to the invention. It will be seen that this couple, as shown by curve II, increases when the angle of opening moves from 0 to about 90°, then decreases when the angle of opening moves from 30 to 90°. It will thus be seen that the peak of curve I can be made to coincide with the peak of curve II and particularly, in the part of the curves corresponding to angles of opening of between 30 and 90°, the spacing between the two curves is reduced compared with what would be obtained if curve II were a straight line parallel to the x axis, as is obtained with a rack and pinion or wheel-tangent screw mechanism, and is even more so compared with a scotch-yoke mechanism in which the curve rotates its convexity downwards. The mechanism according to the invention is also advantageous compared with a crank-connecting rod support system wherein the coefficient of reduction is very high for a value of about 2°, then decreases considerably to about 15°, so as to have a substantially constant value thereafter.

Figure 2:
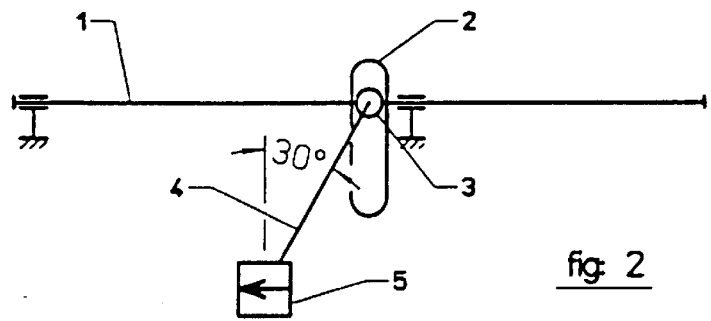
FIGS. 2 and 3 are two diagrams of the preferred embodiment of the invention for a stopvalve actuator.

In FIG. 2, a horizontal rod 1 is moved in translation from right to left and vice versa, for example by pneumatic means. This rod 1 carries a slide 1 inside which are formed grooves allowing a shoe 3 to be guided and to move in translation in the vertical direction. An arm 4 is articulated to the shoe 3 and fixed to the output spindle 5 of an actuator of a stopvalve obturator, fixedly mounted and able to rotate upon itself.

Figure 3:
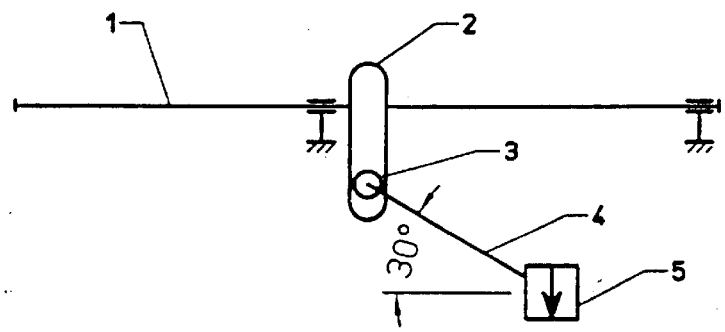

In the position in FIG. 3, which is the open end position, the arm 4 forms an angle of 30° with the rod 1 which defines the trajectory of the slide 2, with the result that in FIG. 2, which shows the other end position, the arm 4 forms an angle of 30° with the vertical, this angle of 300° corresponding to the angle of opening shown in FIG. 1.

Figure 4:
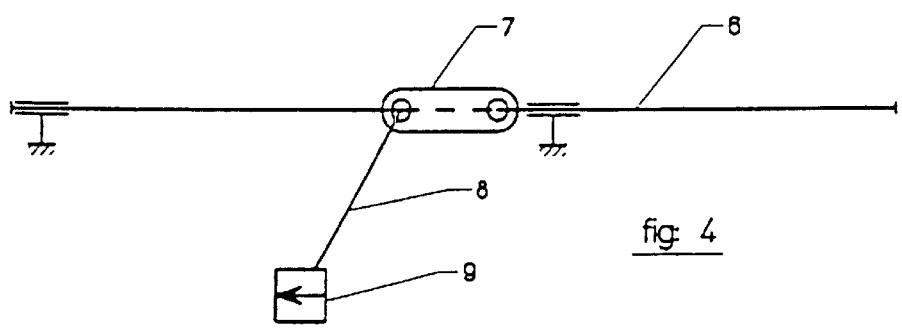
FIGS. 4 and 5 show, in the closed and open positions, respectively, another embodiment of the invention.
Figure 5:
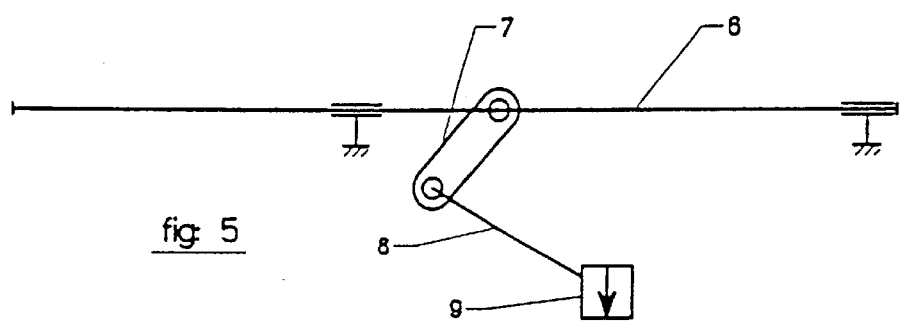

In FIGS. 4 and 5, the end of a connecting rod 7 is articulated on a rod 6 capable of moving horizontally from right to left and then returning, the other end of said connecting rod 7 being articulated on an arm 8 integral with a component 9.

In this connecting rod/crank solution, the rotation of the part 9 is achieved by the translation of the rod 6 which drives the connecting rod in rotation and translation.

Figure 6:
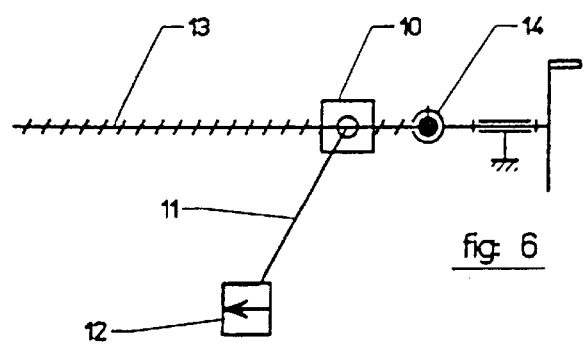
FIGS. 6 and 7 show an alternative embodiment of the invention.
Figure 7:
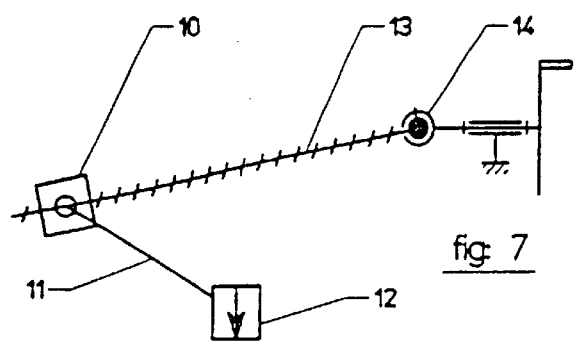

In FIGS. 6 and 7, a slide 10 on which is articulated an arm 11 fixed to the output spindle 12 of the actuator of the stopvalve, is able to move along on a screw 13 rotated by a ball joint 14. When the screw turns, the slide 10 moves along on the screw, whilst the latter rotates about the ball joint 14 so as to reduce the lever arm of the arm 11 on the spindle 12 and then increase it, as in the previous solutions.

Figure 8:
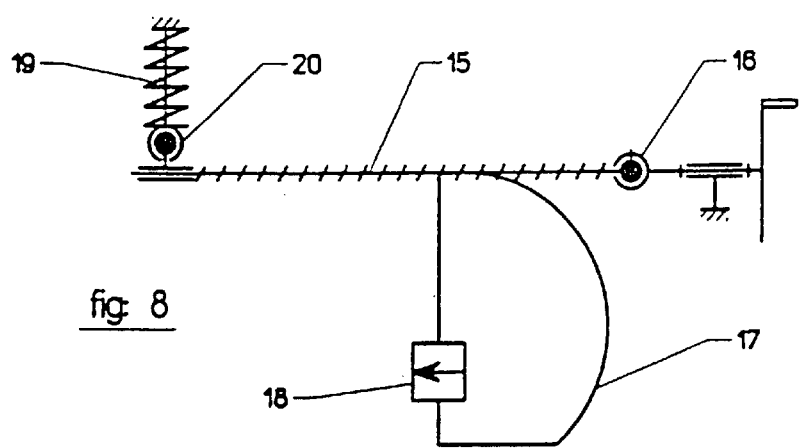
FIGS. 8, 9 and 10 show another alternative embodiment of the invention, with the obturator in the closed position, open position and intermediate position.
Figure 10:
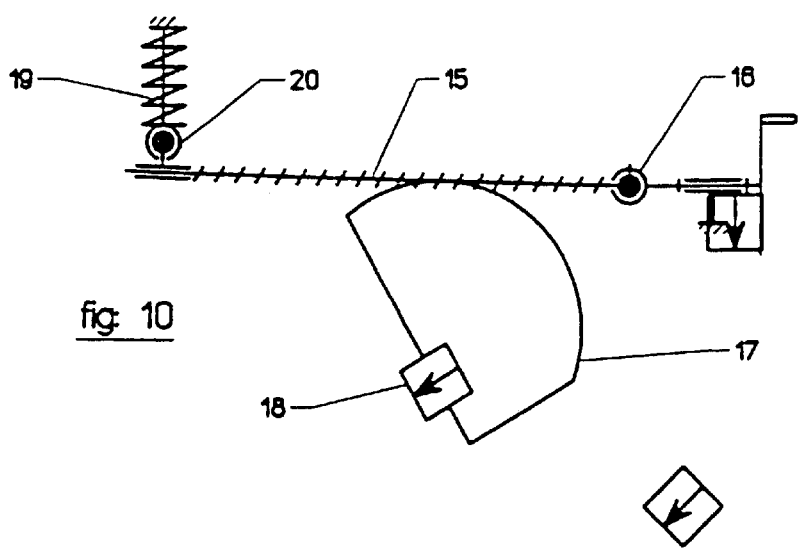
Figure 9:
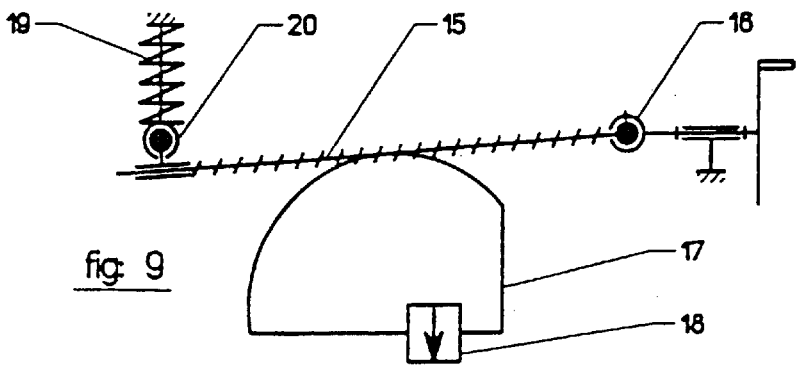

Finally, in the embodiment according to FIGS. 8 to 10, the swivelled screw 15, able to pivot by means of a ball joint 16, cooperates with a pinion 17 in the form of a cam, which is itself integral with the actuating spindle 18 of the stopvalve. A spring 19 with a ball joint 20 maintains the contact between the screw 15 and the pinion 17, whilst allowing the screw 15 to pivot about the ball joint 16.

In the variants in FIGS. 4 to 10, the arm or the equivalent of the arm 4 in FIGS. 2 and 3 forms an angle of 30°, in the end position, with the equivalent of what defines the trajectory of the slide in FIGS. 2 and 3.

What is claimed is:

1. An apparatus for rotating a rotatable part through a 90 degree rotation, said apparatus comprising:
   a moveable slide configured for motion along a substantially linear trajectory;
   a transmission coupling connecting said slide to said rotatable part, said transmission defining a reduction coefficient, wherein said transmission is configured to rotate said part through a 90 degree rotation as said slide travels from a first end of said trajectory to a second end of said trajectory, and wherein said transmission is configured such that said reduction coefficient increases to a peak value as said rotatable part is rotated from 0 degrees through an angle between about 20 degrees and about 40 degrees by linear motion of said slide along said trajectory.

2. The apparatus of claim 1, wherein the slide comprises a shoe, wherein the shoe is moveable in a direction not parallel to the trajectory and being integral with the part which is fixedly mounted but able to rotate.

3. The apparatus of claim 2, wherein the shoe is attached to the rotatable part by an arm fixed to the rotatable part and articulated on the shoe.

4. The apparatus of claim 3, wherein the trajectory and the slide are configured so that the shoe moves perpendicular to the trajectory.

5. The apparatus of claim 4, wherein the arm, at first and second end positions, forms an angle of 20° to 40° with the trajectory.

6. The apparatus of claim 1, wherein the angle is between 28 and 37°.

7. A couple apparatus for rotating a component, comprising:
   an elongate support defining a trajectory;
   a member movably mounted to the support, the member configured to be movable between a first end position and a second end position through activation of the elongate support; and
   a transmission connecting the member and the component such that a reduction coefficient defined by the transmission has a peak value between an angle of rotation of about 20° to about 40°.

* * * * *